US009322323B2

(12) United States Patent
Panciroli

(10) Patent No.: US 9,322,323 B2
(45) Date of Patent: Apr. 26, 2016

(54) METHOD FOR CORRECTING THE REDUCED MASS FLOW RATE OF A COMPRESSOR IN AN INTERNAL COMBUSTION ENGINE TURBOCHARGED WITH A TURBOCHARGER

(71) Applicant: Magneti Marelli S.p.A., Corbetta (IT)

(72) Inventor: Marco Panciroli, Bologna (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 72 days.

(21) Appl. No.: 14/480,758

(22) Filed: Sep. 9, 2014

(65) Prior Publication Data
US 2015/0068191 A1    Mar. 12, 2015

(30) Foreign Application Priority Data
Sep. 10, 2013    (IT) .............................. BO2013A0480

(51) Int. Cl.
*F02B 1/10*    (2006.01)
*F02B 37/12*    (2006.01)
(Continued)

(52) U.S. Cl.
CPC .............. *F02B 37/127* (2013.01); *F02B 37/16* (2013.01); *F02B 37/18* (2013.01); *F02D 23/00* (2013.01); *F02D 41/0007* (2013.01); *F02D 41/0087* (2013.01); *F02D 41/1401* (2013.01); *F02B 2037/122* (2013.01); *F02D 2041/141* (2013.01); *F02D 2041/1409* (2013.01);
(Continued)

(58) Field of Classification Search
CPC .. F02B 37/127; F02B 37/16; F02B 2037/162; F02B 37/166; F02B 37/18; F02B 37/183; F02B 37/186; F02C 6/12; F02D 41/0007; F02D 41/0087; F02D 41/1401; F02D 2041/141; F02D 2041/1418; F02D 2200/0414
USPC ......... 60/273, 280, 324, 602, 605.1, 606, 611
See application file for complete search history.

(56) References Cited

U.S. PATENT DOCUMENTS

| 7,509,803 B2 * | 3/2009 | Panciroli ................ F02B 37/18 60/600 |
| 2006/0005811 A1 | 1/2006 | Hartmann |
| 2007/0179763 A1 | 8/2007 | Perchanok et al. |
| 2013/0080024 A1 * | 3/2013 | Chi ........................ F02D 28/00 701/102 |

FOREIGN PATENT DOCUMENTS

| EP | 2 314 850 A1 | 4/2011 |
| JP | S63-285223 A | 11/1988 |

OTHER PUBLICATIONS

May 15, 2014 Italian Search Report for Italian Patent Application No. BO20130480.

*Primary Examiner* — Jorge Leon, Jr.
(74) *Attorney, Agent, or Firm* — Howard & Howard Attorneys PLLC

(57) ABSTRACT

A method for correcting the reduced mass flow rate of a compressor in an internal combustion engine turbocharged with a turbocharger provided with a turbine and with a compressor; the internal combustion engine including an intake manifold and an exhaust manifold, and being set up to allow the passage of air from the intake manifold to the exhaust manifold; the method including determining, in a design stage, a control law that provides a target opening of a control actuator of the wastegate as a function of an actual supercharging pressure and of a reduced mass flow rate of the compressor; and correcting the reduced mass flow rate of the compressor as a function of the enthalpy of a gas mixture flowing through the turbine of the turbocharger.

12 Claims, 4 Drawing Sheets

(51) Int. Cl.
*F02D 41/00* (2006.01)
*F02B 37/16* (2006.01)
*F02B 37/18* (2006.01)
*F02D 23/00* (2006.01)
*F02D 41/14* (2006.01)

(52) U.S. Cl.
CPC .................. *F02D 2041/1418* (2013.01); *F02D 2200/0402* (2013.01); *F02D 2200/0406* (2013.01); *F02D 2200/0414* (2013.01); *F02D 2200/703* (2013.01)

\* cited by examiner

METHOD FOR CORRECTING THE REDUCED MASS FLOW RATE OF A COMPRESSOR IN AN INTERNAL COMBUSTION ENGINE TURBOCHARGED WITH A TURBOCHARGER

CROSS-REFERENCE TO RELATED APPLICATION

This application is based upon and claims priority to Italian Application No. BO 2013A000480, filed on Nov. 7, 2013.

BACKGROUND OF THE INVENTION

1. Field of the Invention

The present invention relates to a method for correcting the reduced mass flow rate of a compressor in an internal combustion engine turbocharged with a turbocharger.

2. Description of the Related Art

As is known, some internal combustion engines are provided with a turbocharger supercharging system, which may increase the power developed by the engine by exploiting the enthalpy of exhaust gases to compress the air aspirated by the engine and thus increase the volumetric intake performance.

A turbocharger supercharging system includes a turbocharger equipped with a turbine, which is arranged along an exhaust pipe to rotate at high speed under the propelling force of exhaust gases expelled from the engine, and with a compressor, which is driven in rotation by the turbine and is arranged along the air intake duct to compress the air aspirated by the engine. In a turbocharger supercharging system, it is advantageous to the keep the operating range of the turbocharger within a useful zone dependent on engine running conditions for both functional reasons (i.e. to avoid irregular or, in any case, low efficiency operation) and structural reasons (i.e. to avoid damaging the turbocharger). In order to limit the supercharging pressure (i.e. the pressure of the compressed air downstream of the compressor), a bypass duct regulated by a wastegate (valve) is arranged in parallel with the turbine; when the wastegate opens, part of the exhaust gases flow through the bypass duct and thus bypass the turbine, this resulting in a drop in the rotor's rotational speed and a consequent decrease in supercharging.

The wastegate is operated by a pneumatic actuator, which is in turn controlled by a solenoid control valve that enables regulating the action of the wastegate. The pneumatic actuator includes a sealed shell, which internally supports a flexible diaphragm that divides the sealed shell into two reciprocally fluid-tight chambers. The flexible diaphragm is mechanically connected to a rigid rod that operates the wastegate to control the opening and closing of the wastegate. A first chamber is connected to atmospheric pressure, while a second chamber is connected to the supercharging pressure and may also be connected to atmospheric pressure through a duct controlled by the proportional solenoid control valve, which is able to choke the duct between a closed position, in which the duct is completely closed, and a position of maximum opening.

A contrast spring is arranged in the first chamber such that it is compressed between a wall of the shell and the flexible diaphragm and rests against the flexible diaphragm on the side opposite to the rod. When the pressure difference between the two chambers is lower than an operating threshold (determined by the contrast spring preload), the rod keeps the wastegate in a completely closed position, while when the pressure difference between the two chambers is higher than the operating threshold, the contrast spring starts to compress under the thrust of the flexible diaphragm, which thus deforms and causes a displacement of the rod that consequently moves the wastegate towards the open position. By controlling the solenoid control valve, it is possible to connect the second chamber to atmospheric pressure through a variable-sized opening, and so it is possible to adjust the pressure difference between the two chambers that, in turn, causes the opening or closing of the wastegate. It is important to note that until the difference between the supercharging pressure and atmospheric pressure exceeds the operating threshold (equal to the preload generated by the contrast spring divided by the area of the flexible diaphragm), the wastegate may not be opened by the action exerted by the solenoid control valve (which may only reduce, and not increase, the difference between the supercharging pressure and atmospheric pressure).

In known internal combustion engines, a target supercharging pressure is generated that is used to cause operation of the wastegate by adding an open-loop contribution factor and a closed-loop contribution factor: the open-loop contribution factor is generated using an experimentally obtained control map, while the closed-loop contribution factor is provided by a PID regulator that attempts to cancel a pressure error, i.e. a difference between the target supercharging pressure and the actual supercharging pressure measured by a sensor.

However, the preload generated by the contrast spring of the pneumatic actuator has high structure dispersion, considerable thermal drift and also a certain time drift. Furthermore, the pneumatic actuator has considerable hysteresis, i.e. the behaviour of the pneumatic actuator varies significantly between the opening movement and the opposite closing movement. Consequently, the control map used to determine the closed-loop contribution factor is highly nonlinear and pursuing the target supercharging pressure proves to be complicated; thus, pursuing the target supercharging pressure in known internal combustion engines tends to have large overshoots or undershoots (i.e. the actual supercharging pressure significantly exceeds or drops below the target supercharging pressure) and thus causes oscillations, especially when the supercharging pressure is around the operating threshold, below which the wastegate may not be opened by the action exerted by the solenoid control valve.

Overshoots (i.e. peaks) in the supercharging pressure are particularly troublesome because they cause significant stress (and therefore potential damage over time) to the mechanical components of the internal combustion engine and because they generate both noise perceptible by the vehicle occupants and corresponding undesired oscillations in the drive torque generated by the internal combustion engine.

To reduce the size of the overshoots, it is possible to reduce the additional contribution factor of the PID regulator used to calculate the closed-loop contribution factor for operation of the wastegate.

For example, patent EP2314850 describes a method for controlling the wastegate including the steps of determining, in a design stage, a control law that provides a target opening for a control actuator of the wastegate as a function of a supercharging pressure; determining a target supercharging pressure; measuring an actual supercharging pressure; determining a first open-loop contribution factor for a target position of the control actuator of the wastegate with the control law and as a function of the target supercharging pressure; determining a second closed-loop contribution factor for the target position of the control actuator of the wastegate; calculating the target position for the control actuator of the wastegate by adding the two contribution factors; and controlling the control actuator of the wastegate so as to pursue the target position for the control actuator of the wastegate.

The step of determining the second closed-loop contribution factor contemplates determining a virtual position for control actuator of the wastegate with the control law and as a function of the actual supercharging pressure; calculating a position error by calculating the difference between the first open-loop contribution factor of the target position for the control actuator of the wastegate and the virtual position of the control actuator of the wastegate; and determining the second closed-loop contribution factor by processing the position error with a first regulator that attempts to cancel the position error.

However, the control method described in patent EP2314850 is quite robust, quick and devoid of oscillations only in operating conditions where there is no significant passage of air directly from the intake manifold to the exhaust of the internal combustion engine.

The object of the present invention is to provide a method for correcting the reduced mass flow rate of a compressor in an internal combustion engine turbocharged with a turbocharger, this correction method being devoid of the above-described drawbacks and, in particular, simple and inexpensive to implement.

As set forth in the present invention, a method for correcting the reduced mass flow rate of a compressor in an internal combustion engine turbocharged with a turbocharger is provided as claimed in the appended claims.

SUMMARY OF THE INVENTION

The present invention relates to a method for correcting reduced mass flow rate of a compressor in an internal combustion engine turbocharged with a turbocharger. The turbocharger includes a turbine and a compressor, and the internal combustion engine includes an intake manifold, an exhaust manifold and a number of cylinders, each of which is connected to the intake manifold by at least one respective inlet valve and to the exhaust manifold by at least one respective exhaust valve, and in which the direct passage of air from the intake manifold to the exhaust manifold is allowed. The method includes the steps of 1) determining a control law providing a target opening of a wastegate as a function of an actual supercharging pressure and of a reduced mass flow rate ($M_R$) of the compressor; 2) correcting the reduced mass flow rate ($M_R$) of the compressor as a function of the enthalpy of a gas mixture flowing through the turbine of the turbocharger and including both exhaust gases leaving the cylinders and the fresh air passing directly from the intake manifold to the exhaust manifold; 3) determining a target supercharging pressure; 4) measuring an actual supercharging pressure; 5) determining a first open-loop contribution factor of a target position of the wastegate with the control law and as a function of the target supercharging pressure; 6) determining a second closed-loop contribution factor of the target position of the wastegate with the control law and as a function of an actual supercharging pressure; 7) calculating the target position of the wastegate by adding the first open-loop contribution factor and the second closed-loop contribution factor; and 8) controlling the wastegate so as to pursue the target position of the wastegate.

BRIEF DESCRIPTION OF DRAWINGS

Other objects and advantages of the present invention will be readily appreciated as the same becomes better understood after reading the subsequent description taken in connection with the accompanying drawings wherein.

DETAILED DESCRIPTION OF THE INVENTION

Figure 1:
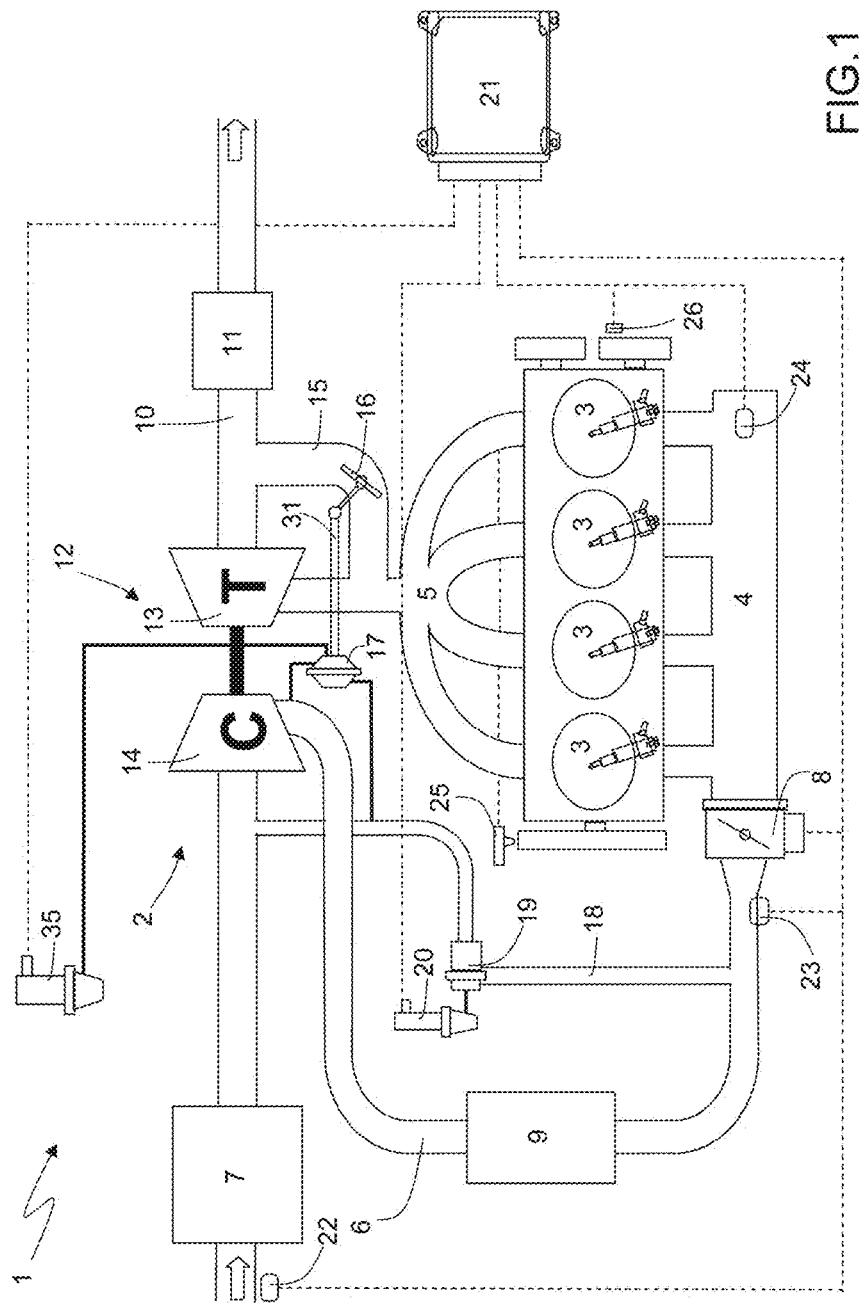
FIG. 1 shows a schematic view of an internal combustion engine turbocharged with a turbocharger and equipped with a control unit that implements the method for correcting the reduced mass flow rate of a compressor.

With reference now to the drawings, FIG. 1 shows, as reference numeral 1 indicates as a whole, an internal combustion engine supercharged with a turbocharger supercharging system 2.

The internal combustion engine 1 includes four cylinders 3, each of which is connected to an intake manifold 4 by at least one respective inlet valve and to an exhaust manifold 5 by at least one respective exhaust valve. The intake manifold 4 receives fresh air (i.e. air coming from the external environment) through an intake duct 6, which is fitted with an air filter 7 and is regulated by a butterfly valve 8. An intercooler 9 for cooling the aspirated air is arranged along the intake duct 6. An exhaust pipe 10 is connected to the exhaust manifold 5 to feed the exhaust gases produced by combustion to an exhaust system, which emits the gases produced by combustion into the atmosphere and normally includes at least one silencer arranged downstream of the catalytic converter 11.

The supercharging system 2 of the internal combustion engine 1 includes a turbocharger 12 equipped with a turbine 13, which is arranged along the exhaust pipe 10 in order to rotate at high speed under the action of the exhaust gases expelled from the cylinders 3, and a compressor 14, which is arranged along the intake duct 6 and is mechanically connected to the turbine 13 in order to be drawn in rotation by the turbine 13 and thus increase the pressure of the air fed through the intake duct 6.

A bypass duct 15 is provided along the exhaust pipe 10 and is connected in parallel to the turbine 13 such that its ends are connected upstream and downstream of the turbine 13. A wastegate 16, which is suitable for regulating the flow of the exhaust gases running through the bypass duct 15 and controlled by a pneumatic actuator 17, is arranged along the bypass duct 15. A bypass duct 18 is provided along the intake duct 6 and is connected in parallel to the compressor 14 such that its ends are connected upstream and downstream of the compressor 14. A Poff valve 19, which is suitable for regulating the flow of air running through the bypass duct 18 and controlled by an electric actuator 20, is arranged along the bypass duct 18.

The internal combustion engine 1 is controlled by an electronic control unit 21, which superintends the operation of all the components of the internal combustion engine 1, including the supercharging system 2. In particular, the electronic control unit 21 controls the actuators 17 and 20 of the wastegate 16 and of the Poff valve 19. The electronic control unit 21 is connected to sensors 22 that measure the temperature and pressure along the intake duct 6 upstream of the compressor 14, to sensors 23 that measure the temperature and pressure along the intake duct 6 upstream of the butterfly valve 8, and to sensors 24 that measure the temperature and pressure inside the intake manifold 4. In addition, the electronic control unit 21 is connected to a sensor 25 that measures the angular position (and thus the speed of rotation) of a crankshaft of the internal combustion engine 1 and a sensor 26 that measures the timing of the intake and/or exhaust valves.

Figure 2:
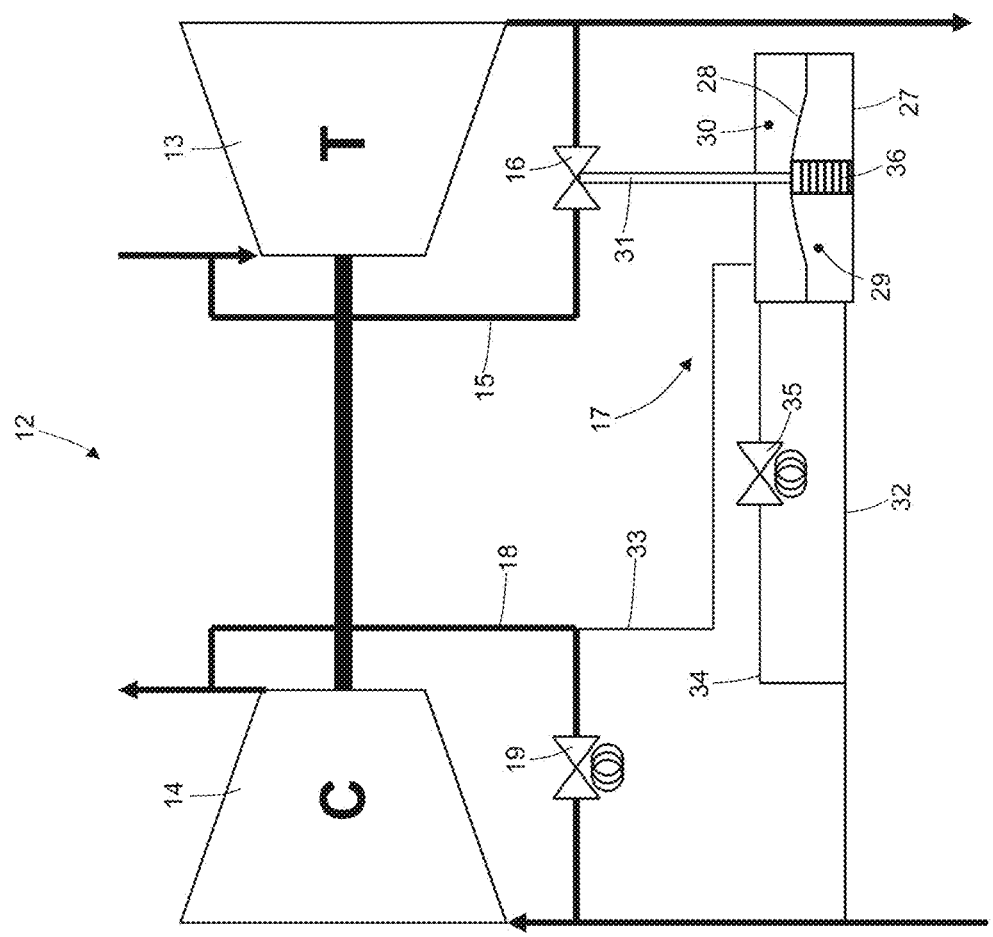
FIG. 2 shows a schematic view of a pneumatic actuator of the wastegate.

As shown in FIG. 2, the pneumatic actuator 17 of the wastegate 16 includes a sealed shell 27 that internally supports a flexible diaphragm 28, which divides the sealed shell 27 into two reciprocally isolated chambers 29 and 30. The flexible diaphragm 28 is mechanically connected to a rigid rod 31 that operates the wastegate 16 to control the opening and closing of the wastegate 16. Chamber 29 is connected with a duct 32 to atmospheric pressure (taken upstream of the compressor 14), while chamber 30 is connected with a duct 33 to the supercharging pressure (taken downstream of the compressor 14) and is connected with a duct 34 to atmospheric pressure (taken upstream of the compressor 14). Although not shown in detail, the duct 34 is regulated by a solenoid control valve 35 that may choke the duct 34 between a closed position, in which the duct 34 is completely closed, and a maximum opening position.

A contrast spring 36 is arranged in chamber 29 such that it is compressed between a wall of the shell 27 and the flexible diaphragm 28 and rests against the flexible diaphragm 28 on the side opposite to the rod 31. When the pressure difference between chamber 30 and chamber 29 is lower than an operating threshold (determined by the preload of the contrast spring 36), the rod 31 keeps the wastegate 16 in a completely closed position, while when the pressure difference between chamber 30 and chamber 29 is higher than the operating threshold, the contrast spring 36 starts to compress under the thrust of the flexible diaphragm 28, which thus deforms and causes a displacement of the rod 31 that consequently moves the wastegate 16 towards the open position. By controlling the solenoid control valve 35, it is possible to connect chamber 30 to atmospheric pressure through a variable-sized opening, and so it is possible to adjust the pressure difference between the two chambers 29 and 30 that, in turn, causes the opening or closing of the wastegate 16.

It is important to note that until the difference between the supercharging pressure P and atmospheric pressure $P_{atm}$ exceeds the operating threshold (equal to the preload generated by the contrast spring 36 divided by the area of the flexible diaphragm 28), the wastegate 16 may not be opened by the action exerted by the solenoid control valve 35 (which may only reduce, and not increase, the difference between the supercharging pressure P and atmospheric pressure $P_{atm}$). Due to structure dispersion, thermal drift and time drift, the preload generated by the contrast spring 36 is only known with relative uncertainty (in the order of ±20%).

Figure 3:
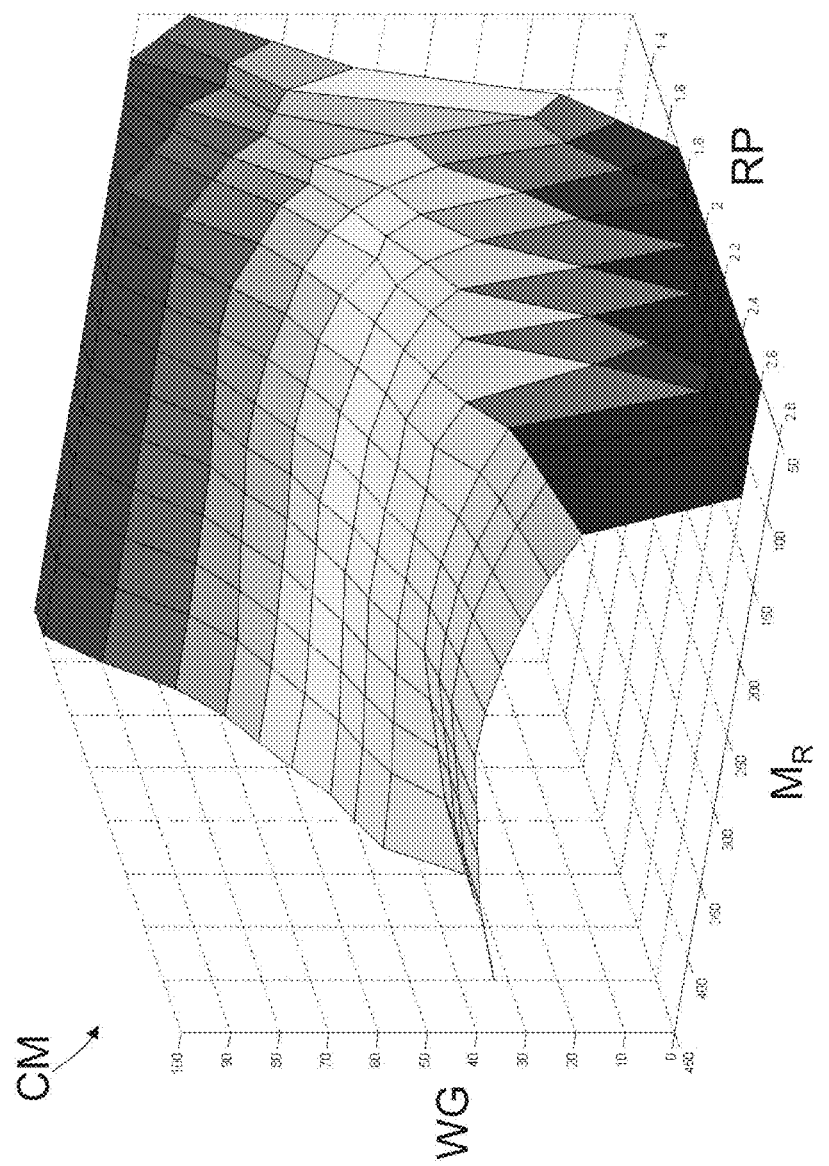
FIG. 3 shows a graph showing an experimental control map.

During a design stage of the internal combustion engine 1, a control law CL is experimentally determined that provides a target opening WG for the solenoid control valve 35 of the wastegate 16 as a function of a supercharging pressure P (or rather a supercharging ratio RP that is equal to the ratio between the supercharging pressure P and atmospheric pressure $P_{atm}$ and is equivalent to the supercharging pressure P) and a reduced mass flow rate $M_R$ of the compressor 14. In other words, the control law CL provides the target opening WG for the solenoid control valve 35 of the wastegate 16 that should allow achieving a desired supercharging pressure P (or rather a desired supercharging ratio RP) in the presence of a given reduced mass flow rate $M_R$. As set forth in one embodiment shown by way of example in FIG. 3, the control law CL includes an experimental map (i.e. a table or rather a matrix, which is highly linear, as is evident in FIG. 3); alternatively, the control law CL may include an arithmetical function. The control law CL is stored in a memory of the electronic control unit 21 for subsequent use as described below.

In use, during normal operation of the internal combustion engine 1, the electronic control unit 21 measures the actual supercharging pressure P (i.e. the air pressure along the intake duct 6 downstream of the compressor 14), measures or estimates (not described in detail but generally known in the art) the atmospheric pressure $P_{atm}$, and estimates (not described in detail but generally known in the art) the actual reduced mass flow rate $M_R$ of the compressor 14. Furthermore, during normal operation of the internal combustion engine 1, the electronic control unit 21 determines, in a known manner, a target supercharging pressure $P_{obj}$, which should be pursued by controlling, if needed, the solenoid control valve 35 of the wastegate 16. In order to control the solenoid control valve 35 of the wastegate 16, the electronic control unit 21 determines a target position $WG_{obj}$ for the solenoid control valve 35 of the wastegate 16, which is normally actuated using an open-loop control.

Figure 4:
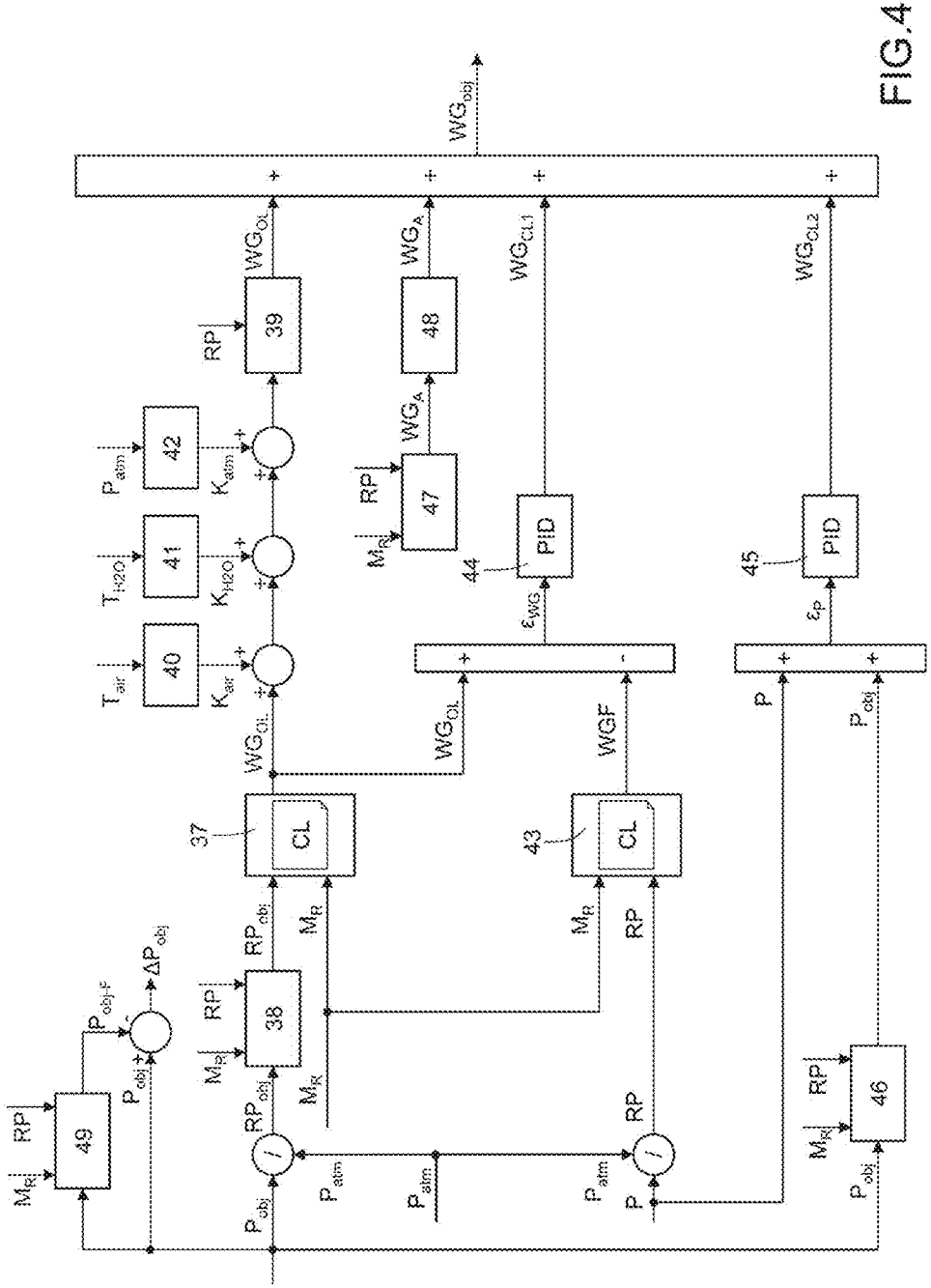
FIG. 4 shows a block diagram of a control logic of the wastegate.

As shown in FIG. 4, the target position $WG_{obj}$ for the solenoid control valve 35 of the wastegate 16 is calculated by algebraically adding (i.e. taking the sign into account) four contribution factors: an open-loop contribution factor $WG_{OL}$, a closed-loop contribution factor $WG_{CL1}$, a closed-loop contribution factor $WG_{CL2}$, and an adaptive contribution factor $WG_A$.

The open-loop contribution factor $WG_{OL}$ is determined using the control law CL: a target compression ratio $RP_{obj}$ (equal to the ratio between the target supercharging pressure $P_{obj}$ and atmospheric pressure $P_{atm}$ and equivalent to the target supercharging pressure $P_{obj}$) is determined as a function of the target supercharging pressure $P_{obj}$; the target compression ratio $RP_{obj}$ and the actual reduced mass flow rate $M_R$ are then supplied to computation block 37 that, by using the control law CL, provides the open-loop contribution factor $WG_{OL}$.

In one embodiment, before being supplied to computation block 37, the target compression ratio $RP_{obj}$ is filtered by a first-order low-pass filter 38 to reduce the speed of change; in other words, the target compression ratio $RP_{obj}$ is filtered by a low-pass filter 38 so as to slow down the evolution of the target compression ratio $RP_{obj}$, in this way "rounding off" any step changes. The function of the low-pass filter 38 is to make the evolution of the target compression ratio $RP_{obj}$ more "real" (i.e. closer to what happens in reality), as it is clear that step changes (or in any case very rapid ones) in the actual supercharging pressure P are not possible because of the apparent physical limits due to the inertia involved. As set forth in one embodiment, a cutoff frequency of the low-pass filter 38 is determined as a function of the reduced mass flow rate $M_R$ of the compressor 14 and the actual supercharging ratio RP as set forth in an experimentally determined law.

As set forth in one embodiment, the open-loop contribution factor $WG_{OL}$, supplied by computation block 37 is first compensated by three compensation parameters $K_{atm}$, $K_{H2O}$ and $K_{air}$ and then filtered by a first-order low-pass filter 39 to reduce speed of change. Compensation parameter $K_{air}$ is determined by computation block 40 as a function of the temperature $T_{air}$ of the aspirated air and using a linear equation having experimentally determined coefficients, compensation parameter $K_{H2O}$ is determined by computation block 41 as a function of the temperature $T_{H2O}$ of a cooling liquid of the internal combustion engine 1 and using a linear equation having experimentally determined coefficients, and compensation parameter $K_{atm}$ is determined by computation block 42 as a function of atmospheric pressure $P_{atm}$ and using a linear equation having experimetically determined coefficients; the coefficients of the linear equation that provides compensation parameter $K_{atm}$ as a function of atmospheric pressure $P_{atm}$ might not be constant, but vary as a function of the reduced mass flow rate $M_R$ of the compressor 14 and the actual supercharging ratio RP as set forth in an experimentally determined law.

The open-loop contribution factor $WG_{OL}$ is filtered by the low-pass filter 39 so as to slow down the evolution of the open-loop contribution factor $WG_{OL}$, in this way "rounding off" any step changes. The function of the low-pass filter 39 is to make the evolution of the open-loop contribution factor $WG_{OL}$ more "real" (i.e. closer to what happens in reality), as it is clear that step changes (or in any case very rapid ones) in the position of the solenoid control valve 35 are not possible because of the apparent physical limits due to the inertia involved. As set forth in one embodiment, a cutoff frequency for low-pass filter 39 is determined as a function of the actual supercharging ratio RP as set forth in an experimentally determined law. As set forth in one embodiment, the open-loop contribution factor $WG_{OL}$ is asymmetrically filtered by the low-pass filter 39: the open-loop contribution factor $WG_{OL}$ is filtered by the low-pass filter 39 only when the open-loop contribution factor $WG_{OL}$ varies to open the wastegate 16 and not when the open-loop contribution factor $WG_{OL}$ varies to close the wastegate 16. In this manner, the action of the compressor 14 is more rapid (more reactive), favoring the responsiveness of the internal combustion engine 1 (thereby reducing turbo-lag), while the stopping of the compressor 14 is softer. It should be noted that when maximum performance is sought, an "abrupt" reaction of the internal combustion engine 1 is acceptable (and in some cases even desired), while in other cases "softer" behavior, i.e. without excessively rapid and sharp reactions, is desired. It should also be noted that by virtue of the presence of the low-pass filter 39, possible oscillatory phenomena in the pneumatic actuator 17 of the wastegate 16 are either eliminated or greatly attenuated. This result is achieved by virtue of the fact that the action of the low-pass filter 39 avoids passing excessively rapid stress variations, which could trigger oscillatory phenomena, to the flexible diaphragm 28 and the contrast spring 36.

The closed-loop contribution factor $WG_{CL1}$ of the target position $WG_{obj}$ of the solenoid control valve 35 of the wastegate 16 is obtained by using a virtual position WGF of the wastegate 16 (therefore a control quantity that has no precise correspondence with physical reality) as a feedback variable, which is not determined by direct measurement with a real measurement sensor, but by using the control law CL as a measurement sensor. In other words, a computation block 43 supplies the virtual position WGF of the wastegate 16 by applying the control law CL based on the actual supercharging pressure P (or rather the actual supercharging ratio RP) and the reduced mass flow rate $M_R$ of the compressor 14. Thus, the virtual position WGF of the wastegate 16 corresponds to the position that the wastegate 16 should have as set forth in the control law CL (and thus affected by all the errors of the control law CL) in conjunction with the actual supercharging ratio RP and the actual reduced mass flow rate $M_R$ of the compressor 14. The virtual position WGF of the wastegate 16 is compared with the open-loop contribution factor $WG_{OL}$, which corresponds to the position that the wastegate 16 should have as set forth in the control law CL (and thus affected by all the errors of the control law CL) in conjunction with the target compression ratio $RP_{obj}$ and the actual reduced mass flow rate $M_R$ of the compressor 14; in other words, the open-loop contribution factor $WG_{OL}$ represents a target for the virtual position WGF as it is calculated using the target compression ratio $RP_{obj}$. In particular, a position error $\epsilon_{WG}$ is computed by calculating the difference between the open-loop contribution factor $WG_{OL}$ of the target position $WG_{obj}$ of the solenoid control valve 35 of the wastegate 16 and the virtual position WGF of the wastegate 16, and this position error $\epsilon_{WG}$ is supplied to a PID regulator 44, which attempts to cancel the position error $\epsilon_{WG}$.

The fact of comparing two values (the open-loop contribution factor $WG_{OL}$, which represents a target for the virtual position WGF, and the virtual position WGF) obtained from the control law CL allows the PID regulator 44 to compensate the errors of the control law CL and to linearize the highly nonlinear behaviour of the wastegate 16; in this manner, the PID regulator 44 may work more stably and the calibration of the control parameters (i.e. of the proportional, integrative and derivative coefficients and the saturation thresholds) of the PID regulator 44 is relatively simple. Furthermore, the control loop of the PID regulator 44 is self-compensated with respect to the temperature $T_{air}$ of the aspirated air, the temperature $T_{H2O}$ of a cooling liquid of the internal combustion engine 1, and atmospheric pressure $P_{atm}$.

The closed-loop contribution factor $WG_{CL2}$ of the target position $WG_{obj}$ of the solenoid control valve 35 of the wastegate 16 is determined by using the supercharging pressure P as a feedback variable; a pressure error $\epsilon_P$ is then computed by calculating the difference between the target supercharging pressure $P_{obj}$ and the actual supercharging pressure P, and the pressure error $\epsilon_P$ is supplied to a PID regulator 45, which attempts to cancel the pressure error $\epsilon_P$.

In one embodiment, before being compared with the actual supercharging pressure P, the target supercharging pressure $P_{obj}$ is filtered by a first-order low-pass filter 46 to reduce the speed of change; in other words, the target supercharging pressure $P_{obj}$ is filtered by the low-pass filter 46 so as to slow down the evolution of the target supercharging pressure $P_{obj}$, in this way "rounding off" any step changes. The function of the low-pass filter 46 is to make the evolution of the target supercharging pressure $P_{obj}$ more "real" (i.e. closer to what happens in reality), as it is clear that step changes (or in any case very rapid ones) in the actual supercharging pressure P are not possible because of the apparent physical limits due to the inertia involved. As set forth in one embodiment, a cutoff frequency for low-pass filter 46 is determined as a function of the reduced mass flow rate $M_R$ of the compressor 14 and the actual supercharging ratio RP as set forth in an experimentally determined law.

To avoid negative interference between the action of PID regulator 44 and the action of PID regulator 45, the dynamics of PID regulator 44 are different from the dynamics of PID regulator 45; in particular, PID regulator 44 is essentially proportional and derivative (i.e. has high proportional and derivative coefficients and a low integral coefficient) in order to be ready (i.e. to work rapidly), while PID regulator 45 is essentially integral (i.e. has low proportional and derivative coefficients and a high integral coefficient) in order to guarantee convergence between the target supercharging pressure $P_{obj}$ and the actual supercharging pressure P. Thus, PID regulator 44 is used to react rapidly and promptly to variation in the target supercharging pressure $P_{obj}$, while PID regulator 45 is used make the actual supercharging pressure P converge with the target supercharging pressure $P_{obj}$ at the end of the transient.

The adaptive contribution factor $WG_A$ of the target position $WG_{obj}$ of the solenoid control valve 35 of the wastegate 16 is essentially a "historical memory" of previous operation of the wastegate 16 and takes past control actions into account. The adaptive contribution factor $WG_A$ is stored in a memory 47 of the electronic control unit 21 and is cyclically updated when the turbocharger 12 is at a steady speed (for example, when the reduced mass flow rate $M_R$ of the compressor 14 and the supercharging ratio RP remain approximately constant for at least a predetermined interval of time) by using an integral term of PID regulator 45 and/or PID regulator 44. The adaptive contribution factor $WG_A$ is equal to an "average" of past integral terms of PID regulator 45 and/or PID regulator 44 when the turbocharger 12 was under steady speed conditions. When the turbocharger 12 is in steady running conditions, the adaptive contribution factor $WG_A$ stored in the memory 47 is updated by using the integral term of PID regulator 45 and/or PID regulator 44 weighted by a weight W that is essentially based on an actual position WG of the solenoid control valve 35 of the wastegate 16 in such a way that the weight W is minimum when the hysteresis in controlling the wastegate 16 is maximum; in this manner, adaptation is frequently gradual (i.e. the last integral term of PID regulator 45 and/or PID regulator 44 may not distort the adaptive contribution factor $WG_A$ stored in the memory 47) and loading hysteresis-distorted values in the adaptive contribution factor $WG_A$ is avoided.

Generally, the adaptive contribution factor $WG_A$ varies as a function of the reduced mass flow rate $M_R$ of the compressor 14 and the supercharging ratio RP. Furthermore, the adaptive contribution factor $WG_A$ is filtered by a first-order low-pass filter 48 to reduce the speed of change; in other words, the adaptive contribution factor $WG_A$ is not supplied abruptly, but is supplied gradually to avoid step-like operation, which never corresponds to the physical reality, and thus to favor control convergence. As set forth in one embodiment, the cutoff frequency of low-pass filter 48 is constant; alternatively, the cutoff frequency of low-pass filter 48 could be altered as a function of the reduced mass flow rate $M_R$ of the compressor 14 and the supercharging ratio RP.

The integral term of the PID regulators 44 and 45 incorporates a "memory" of the errors that occurred in the immediate past; therefore, when variations in the surrounding conditions occur, the "memory" of the errors that occurred in the immediate past contained in the integral term of PID regulators 44 and 45 may have negative effects because it represents a situation that is no longer present.

The electronic control unit 21 resets (or possibly "freezes", i.e. prevents a further growth of) each integral term of the PID regulators 44 and 45 in the case of rapid change, i.e. a high transient, in the target supercharging pressure $P_{obj}$ if the integral term itself is high, i.e. higher than the absolute value of a predetermined threshold; in other words, when a rapid change occurs in the target supercharging pressure $P_{obj}$ and an integral term of the PID regulators 44 and 45 is higher in absolute value than a predetermined threshold, then the integral term is either reset or frozen (i.e. it is not changed until the end of the high transient).

To establish whether a high transient of the target supercharging pressure $P_{obj}$ is present (i.e. a rapid change in the target supercharging pressure $P_{obj}$), the electronic control unit 21 compares the target supercharging pressure $P_{obj}$ with a target supercharging pressure $P_{obj-F}$ filtered by low-pass filter 49 to determine a gradient $\Delta P_{obj}$ of the target supercharging pressure $P_{obj}$ that indicates the speed of change of the target supercharging pressure $P_{obj}$. In other words, gradient $\Delta P_{obj}$ of the target supercharging pressure $P_{obj}$ is computed by calculating the difference between the target supercharging pressure $P_{obj}$ and the target supercharging pressure $P_{obj-F}$ filtered by low-pass filter 49. When gradient $\Delta P_{obj}$ of the target supercharging pressure $P_{obj}$ is higher than a threshold value, the electronic control unit 21 then establishes the presence of a high transient of the target supercharging pressure $P_{obj}$ (i.e. of a rapid change in the target supercharging pressure $P_{obj}$) and thus resets (or possibly "freezes") the integral terms of the PID regulators 44 and 45; this threshold value may be based on the supercharging ratio RP and the reduced mass flow rate $M_R$ of the compressor 14. As set forth in one embodiment, a cutoff frequency of the low-pass filter 49 is determined as a function of the reduced mass flow rate $M_R$ of the compressor 14 and the actual supercharging ratio RP as set forth in an experimentally determined law.

As set forth in one embodiment, the electronic control unit 21 alters the integral coefficients of the PID regulators 44 and 45 as a function of the pressure error $\epsilon_P$, so as alter the control characteristics as the magnitude of the pressure error $\epsilon_P$ varies. In particular, the electronic control unit 21 alters the integral coefficients of the PID regulators 44 and 45 in a manner inversely proportional to the pressure error $\epsilon_P$, such that the smaller the pressure error $\epsilon_P$ the higher the integral coefficients of the PID regulators 44 and 45, and alters the proportional coefficients of the PID regulators 44 and 45 in a manner directly proportional to the pressure error $\epsilon_P$, such that the larger the pressure error $\epsilon_P$ the higher the proportional coefficients of the PID regulators 44 and 45. In other words, the integral term of the PID regulators 44 and 45 (directly proportional to the integral coefficients of the PID regulators 44 and 45) serves to guarantee convergence between the actual supercharging pressure P and the target supercharging pressure $P_{obj}$, but this convergence is reached at the end of a transient period when the pressure error $\epsilon_P$ is relatively small; at the beginning of the transient period when the pressure error $\epsilon_P$ is large, the integral term of the PID regulators 44 and 45 may generate oscillations and so, to avoid this risk, the integral coefficients of the PID regulators 44 and 45 are reduced at the beginning of the transient period when the pressure error $\epsilon_P$ is large. The opposite applies to the proportional terms of the PID regulators 44 and 45 (directly proportional to the proportional and derivative coefficients of the PID regulators 44 and 45), which should be high when the pressure error $\epsilon_P$ is large to ensure rapid response and should be low when the pressure error $\epsilon_P$ is small to ensure convergence.

In the above-described low-pass filters 38, 46 and 49, the cutoff frequency is determined as a function of the reduced mass flow rate $M_R$ of the compressor 14 and the actual supercharging ratio RP; as set forth in an equivalent embodiment, the cutoff frequency is determined as a function of the speed of rotation of the internal combustion engine 1 and of a gear engaged in a transmission driven by the internal combustion engine 1. In this regard, it is important to note that the dynamics of the turbocharger 12 vary significantly with respect to the gear engaged, as the rise in the speed of rotation of the internal combustion engine 1 is rapid in the low gears, and so the increase in rotational speed of the turbocharger 12 is equally rapid; instead, in the high gears, the rise in the speed of rotation of the internal combustion engine 1 is slow, and so the increase in rotational speed of the turbocharger 12 is equally slow.

Similarly, the threshold value with which the gradient $\Delta P_{obj}$ of the target supercharging pressure $P_{obj}$ is compared to establish whether a high transient of the target supercharging pressure $P_{obj}$ is present may also be a function of the reduced mass flow rate $M_R$ of the compressor 14 and the actual supercharging ratio RP or it could be a function of the speed of rotation of the internal combustion engine 1 and a gear engaged in a transmission driven by the internal combustion engine 1.

It should be pointed out that the supercharging pressure P and the supercharging ratio RP are sufficiently equivalent to one another, because the atmospheric pressure $P_{atm}$ is approximately constant and has a value approximating to a unitary value; therefore, using the supercharging ratio RP is equivalent to using the supercharging pressure P and vice versa. In the control chart shown in FIG. 4 and described above, the supercharging ratio RP is used, but as set forth in one embodiment, it is possible to use the supercharging pressure P instead of the supercharging ratio RP.

In the embodiment described above, the control law CL provides a target opening WG for the solenoid control valve 35 of the wastegate 16 as a function of a supercharging pressure P (or rather a supercharging ratio RP that is equal to the ratio between the supercharging pressure P and atmospheric pressure $P_{atm}$ and is equivalent to the supercharging pressure P) and a reduced mass flow rate $M_R$ of the compressor 14; as set forth in an one embodiment, the control law CL provides a target opening WG for the solenoid control valve 35 of the wastegate 16 as a function of the power delivered by the internal combustion engine 1 and volumetric efficiency of the internal combustion engine 1, or as a function of a speed of rotation of the internal combustion engine 1 and volumetric efficiency of the internal combustion engine 1 (apparent different combinations of the parameters of the internal combustion engine 1 are also possible).

The electronic control unit 21 is also set up to control the turbocharged internal combustion engine 1 in order to reduce as much as possible the phenomenon known as turbolag, i.e. the turbocharging response delay of the turbocharger 12.

In particular, the electronic control unit 21 is set up to control the turbocharged internal combustion engine 1 to operate in scavenging mode, in which a significant passage of air directly from the intake manifold 4 to the exhaust pipe 10 of the internal combustion engine 1 is contemplated.

Two possible operating configurations are thus possible, of which a first configuration hereinafter indicated as the normal or traditional configuration and a second configuration hereinafter indicated as the scavenging configuration, in which there is significant passage of air directly from the intake manifold 4 to the exhaust pipe 10 of the internal combustion engine 1.

Typically, the passage of air directly from the intake manifold 4 to the exhaust pipe 10 is implemented by an opportune timing of the inlet valves that connect each cylinder 3 to the intake manifold 4 and the exhaust valves that connect each cylinder 3 to the exhaust manifold 5 to allow the passage of fresh air directly from the intake manifold 4 to the exhaust manifold 5 and then to the exhaust pipe 10 of the internal combustion engine 1.

It is evident that the operation of the inlet valves that connect each cylinder 3 to the intake manifold 4 and the exhaust valves that connect each cylinder 3 to the exhaust manifold 5 may be implemented by a known type of actuator, such as, for example, a VVT (Variable Valve Timing) actuator, a camless electromagnetic actuator, or an electrohydraulic actuator.

As set forth in a further variant, the electronic control unit 21 is also set up to control the turbocharged internal combustion engine 1 in order to increase the mass and volumetric flow rates of air and/or exhaust gases that flow through the compressor 14 and the turbine 13, with respect to the flow rate of air actually used by the turbocharged internal combustion engine 1 in combustion to generate the desired power level.

In order to implement the aforesaid control strategy, the electronic control unit 21 is set up to differentiate the running of the cylinders 3, in particular, to differentiate the flow rate of aspirated air and air trapped by each cylinder 3, and to differentiate the operating mode. The electronic control unit 21 is set up to generate the target torque required by the driver of the vehicle with only some of the cylinders 3 firing, while the remaining cylinders 3 draw in as much air as possible. For example, in a turbocharged internal combustion engine 1 with four cylinders 3, two cylinders 3 are active and produce the desired torque by drawing in a mass of air that is approximately double with respect to the mass of air they would draw in under normal running conditions (namely in the case where all four cylinders 3 are active). The two remaining cylinders 3 are not active and are controlled to draw in the most air, but are not involved in combustion. The mass of air that flows through the two inactive cylinders does not take part in combustion and passes directly from the intake manifold to the exhaust.

Two possible operating configurations are thus possible, of which a first configuration with four actively firing cylinders (hereinafter indicated as the normal configuration) and a second configuration with two cylinders 3 actively firing and two cylinders 3 that are controlled in air intake, but are not involved in fuel injection or combustion (hereinafter indicated as the virtual scavenging configuration).

The control strategies of the scavenging or virtual scavenging configuration and the normal configuration are described in patent applications BO2012A000322, BO2012A000323 and BO2012A000324, entirely incorporated herein for reference.

In the case where the internal combustion engine 1 is in the scavenging or virtual scavenging configuration, the following relation holds:

$$m=m_{com}+m_{scav} \qquad [1]$$

$$m_{scav}=m-m_{com} \qquad [1*]$$

where, m: total air mass flow rate (advantageously low) through the internal combustion engine 1;

$m_{com}$: mass flow rate of air trapped in the active cylinders 3 that take part in combustion; and $m_{scav}$: mass flow rate of air that is not involved in combustion and flows directly from the intake manifold 4 to the exhaust.

Let us now consider a generic differential formula for the enthalpy at constant pressure per unit mass, according to which:

$$dh(T)=Cp*dT \qquad [2]$$

where, h: enthalpy per unit mass;

Cp: specific heat of gas at a constant pressure; and

T: gas temperature.

By using formula [2], it is possible to obtain the differential formula for the enthalpy of the total air mass flow rate m (advantageously low) through the internal combustion engine 1, according to which:

$$dH(T)=m*Cp*dT \qquad [3]$$

where,

H: enthalpy of total air mass flow rate m (advantageously low) through the internal combustion engine 1;

m: total air mass flow rate (advantageously low) through the internal combustion engine 1;

Cp: specific heat of gas at a constant pressure; and

T: gas temperature.

Integrating formula [3] gives the following:

$$H(T)=m*Cp*(T-T_{ref}) \qquad [4]$$

where,

H: enthalpy of total air mass flow rate m (advantageously low) through the internal combustion engine 1;

m: total air mass flow rate (advantageously low) through the internal combustion engine 1;

Cp: specific heat of gas at a constant pressure;
T: gas temperature; and
$T_{ref}$: reference temperature of gas.

Assuming that the temperature $T_{ref}$ of the gas is equal to zero, it is then possible to simplify formula [4] to give:

$$H(T)=m*Cp*T \quad [5]$$

where,
H: enthalpy of total air mass flow rate m (advantageously low) through the internal combustion engine 1;
m: total air mass flow rate (advantageously low) through the internal combustion engine 1;
Cp: specific heat of gas at a constant pressure; and
T: gas temperature.

In the case where the internal combustion engine 1 is in the scavenging configuration, the enthalpy value of the exhaust gases is obtained by substituting terms in formula [5] to give the following formula:

$$H_{com}(T_{ext})=m_{com}*Cp*T_{ext} \quad [6]$$

where,
$H_{com}$: enthalpy of mass flow rate $m_{com}$ of air trapped in the cylinders 3 that participate in combustion;
$m_{com}$: mass flow rate of air trapped in the cylinders 3 that participate in combustion;
Cp: specific heat of gas at a constant pressure; and
$T_{ext}$: temperature of exhaust gases reaching the exhaust system and estimated by the electronic control unit.

The enthalpy value of the mixture of exhaust gases and fresh air is obtained by substituting terms in formula [5] to give the following formula:

$$H(T_{mixt})=m*Cp*T_{mixt} \quad [7]$$

where,
H: enthalpy of total air mass flow rate m (advantageously low) through the internal combustion engine 1;
m: total air mass flow rate (advantageously low) through the internal combustion engine 1;
Cp: specific heat of gas at a constant pressure; and
$T_{mixt}$: temperature of the mixture of exhaust gases and fresh air.

The temperature $T_{mixt}$ of the mixture of exhaust gases and fresh air may be calculated with the following formula:

$$T_{mixt}=(T_{ext}*m_{com}+T_{air}*m_{scav})/m \quad [8]$$

where,
$T_{mixt}$: temperature of the mixture of exhaust gases and fresh air;
m: total air mass flow rate (advantageously low) through the internal combustion engine 1;
$T_{ext}$: temperature of exhaust gases reaching the exhaust system and estimated by the electronic control unit;
$m_{com}$: mass flow rate of air trapped in the cylinders 3 that participate in combustion;
$T_{air}$: temperature of air inside the intake manifold 4 measured by a temperature sensor arranged inside the intake manifold 4; and
$m_{scav}$: mass flow rate of air that is not involved in combustion and flows directly from the intake manifold 4 to the exhaust.

The temperature $T_{mixt}$ of the mixture of exhaust gases and fresh air may be calculated with formula [7], which represents the mixing balance of two gas masses that have different temperatures, although it is possible to assume that they have the same pressure and the same specific heat Cp at constant pressure.

From the ratio between the enthalpy value of the mixture of exhaust gases and fresh air obtained with formula [7] and the enthalpy value of the exhaust gases obtained with formula [6], it follows that:

$$H(T_{mixt})/H_{com}(T_{ext})=(m*Cp*T_{mixt})/(m_{com}*Cp*T_{ext}) \quad [9]$$

Substituting the temperature $T_{mixt}$ of the mixture of exhaust gases and fresh air calculated with formula [8] in the just obtained equation [9], gives:

$$H(T_{mixt})/H_{com}(T_{ext}) = (m*T_{ext}*m_{com} + m*T_{air}*m_{scav})/ \quad [10]$$
$$(m*m_{com}*T_{ext})$$
$$= (T_{ext}*m_{com} + T_{air}*m_{scav})/(m_{com}*T_{ext})$$
$$= 1 + (T_{air}*m_{scav})/(m_{com}*T_{ext})$$
$$= 1 + (T_{air}/T_{ext})*(m_{scav}/m_{com})$$

Substituting, with formula [1*], the mass flow rate $m_{scav}$ of air that is not involved in combustion and flows directly from the intake manifold 4 to the exhaust in the just obtained equation [10] gives:

$$=1+(T_{air}/T_{ext})*((m-m_{com})/m_{com})$$

$$=1+(T_{air}/T_{ext})*(m/m_{com}-1)$$

$$=1+(T_{air}/T_{ext})*(\eta_{scav}-1) \quad [11]$$

Where $\eta_{scav}$ represents the scavenging efficiency of the cylinders 3 and is obtained from the ratio between the total air mass flow rate m (advantageously low) through the internal combustion engine 1 and the mass flow rate $m_{com}$ of air trapped inside the cylinders 3 that participate in combustion.

Finally, from formula [11], it is possible to calculate the enthalpy value of the mixture of exhaust gases and fresh air as follows:

$$H(T_{mixt})=H_{com}(T_{ext})*[1+(T_{air}/T_{ext})*(\eta_{scav}-1)] \quad [12]$$

A corrective enthalpy value $H_{corr\_1}$ may then be defined that is equal to:

$$H_{corr\_1}=[1+(T_{air}/T_{ext})*(\eta_{scav}-1)] \quad [13]$$

It is important to stress that the hitherto described method for determining the corrective enthalpy value $H_{corr\_1}$ contemplates assuming the following working conditions:
  the exhaust pressure remains substantially constant;
  ideal gases are used; and
  the fuel mass $m_{fuel}$ is negligible.

The corrective enthalpy value $H_{corr\_1}$ is used in the control law CL, which provides the target opening WG for the solenoid control valve 35 of the wastegate 16 as a function of the supercharging pressure P (or rather a supercharging ratio RP that is equal to the ratio between the supercharging pressure P and atmospheric pressure $P_{atm}$ and is equivalent to the supercharging pressure P) and the reduced mass flow rate $M_R$ of the compressor 14. In particular, the corrective enthalpy value $H_{corr\_1}$ is used in the control law CL for correcting the reduced mass flow rate $M_R$ of the compressor 14; it is advisable to use the corrective enthalpy value $H_{corr\_1}$ for correcting the reduced mass flow rate $M_R$ of the compressor 14 because the expansion work in the turbine 13 is substantially equal to the enthalpy jump of the fluid flowing through the turbine 13.

The corrected reduced mass flow rate $M_R$ corr may be calculated as follows:

$$M_{R\_corr}=M_R/\eta_{scav}*H_{corr\_1} \quad [14]$$

where, $M_{R\_corr}$: corrected reduced mass flow rate of the compressor 14;

$M_R$: estimated reduced mass flow rate of the compressor 14; and $H_{corr\_1}$: first corrective enthalpy value calculated with formula [13].

It is therefore possible to correct the reduced mass flow rate $M_R$ of the compressor 14 as a function of the enthalpy of the gas mixture flowing through the turbine 13 of the turbocharger 12.

It is important to stress that the reduced mass flow rate $M_R$ of the compressor 14 corresponds to the total air mass flow rate m (advantageously low) through the internal combustion engine 1 used in the foregoing description regarding formulae [1] to [13].

As set forth in a one embodiment, the corrected reduced mass flow rate $M_{R\_corr}$ of the compressor 14 may be calculated as follows:

$$M_{R\_corr}=M_R/\eta_{scav}*H_{corr\_1}*H_{corr\_2} \quad [14]$$

where, $M_{R\_corr}$: corrected reduced mass flow rate of the compressor 14;

$M_R$: estimated reduced mass flow rate of the compressor 14;

$H_{corr\_1}$: first corrective enthalpy value calculated with formula [13]; and $H_{corr\_2}$: second corrective enthalpy value.

In this case as well, it is important to stress that the reduced mass flow rate $M_R$ of the compressor 14 corresponds to the total air mass flow rate m (advantageously low) through the internal combustion engine 1 used in the foregoing description regarding formulae [1] to [13].

The second corrective enthalpy value $H_{corr\_2}$ may be expressed as follows:

$$H_{corr\_2}=f(\eta_{scav},T_{air}/T_{ext}) \quad \text{[bypass duct 15]}$$

where, $H_{corr\_2}$: second corrective enthalpy value;

$T_{ext}$: temperature of exhaust gases reaching the exhaust system and estimated by the electronic control unit;

$T_{air}$: temperature of air inside the intake manifold measured by a temperature sensor arranged inside the intake manifold; and $\eta_{scav}$: scavenging efficiency of the cylinders 3 obtained from the ratio between the total air mass flow rate m (advantageously low) through the internal combustion engine 1 and the mass flow rate $m_{com}$ of air trapped inside the cylinders 3 that participate in combustion.

The second corrective enthalpy value $H_{corr\_2}$ is represented by a map based on the above-listed parameters that may be calibrated in a preliminary setup and tuning stage and be stored in the electronic control unit.

As set forth in a further variant, the corrected reduced mass flow rate $M_R$ torr of the compressor 14 may be calculated as follows:

$$M_{R\_corr}=M_R/\eta_{scav}*H_{corr\_2} \quad [16]$$

where, $M_{R\_corr}$: corrected reduced mass flow rate of the compressor 14;

$M_R$: estimated reduced mass flow rate of the compressor 14; and $H_{corr\_2}$: second corrective enthalpy value.

Here, it is important to stress that the reduced mass flow rate $M_R$ of the compressor 14 corresponds to the total air mass flow rate m (advantageously low) through the internal combustion engine 1 used in the foregoing description regarding formulae [1] to [13].

The second corrective enthalpy value $H_{corr\_2}$ may be expressed as indicated in formula [15], in which the second corrective enthalpy value $H_{corr\_2}$ is represented by a map based on the above-listed parameters that may be calibrated in a preliminary setup and tuning stage and be stored in the electronic control unit.

It is also important to stress that the first corrective enthalpy value $H_{corr\_1}$ and the second corrective enthalpy value $H_{corr\_2}$ are completely independent from one another; or rather, the first corrective enthalpy value $H_{corr\_1}$ may be used to calculate the corrected reduced mass flow rate $M_{R\_corr}$ of the compressor 14 independently of the second corrective enthalpy value $H_{corr\_2}$, and vice versa.

In conclusion, the corrected reduced mass flow rate $M_{R\_corr}$ of the compressor 14 may be expressed as follows:

$$M_{R\_corr}=M_R*H_{corr} \quad [17]$$

$$H_{corr}=H_{corr\_1}*H_{corr\_2}*(1/\eta_{scav}) \quad [18]$$

where, $M_{R\_corr}$: corrected reduced mass flow rate of the compressor 14;

$M_R$: estimated reduced mass flow rate of the compressor 14;

$H_{corr}$: overall corrective enthalpy value;

$H_{corr\_1}$: first corrective enthalpy value (which may be equal to 1);

$H_{corr\_2}$: second corrective enthalpy value (which may be equal to 1); and $\eta_{scav}$: scavenging efficiency of the cylinders 3 obtained from the ratio between the total air mass flow rate m (advantageously low) through the internal combustion engine 1 and the mass flow rate $m_{com}$ of air trapped inside the cylinders 3 that participate in combustion.

It will be appreciated that the method described herein for correcting the reduced mass flow rate $M_R$ of the compressor 14 may find advantageous application not only in controlling the solenoid control valve 35 of the wastegate 16, i.e. determining a target position $WG_{obj}$ of the solenoid control valve 35 of the wastegate 16, but also in the case of mechanical regulation of the wastegate 16 (for example, with an electromechanical actuator) to determine a target position $WG_{obj}$ of the wastegate 16.

The above-described method for correcting the reduced mass flow rate $M_R$ of the compressor 14 has numerous advantages.

Firstly, the above-described method for correcting the reduced mass flow rate $M_R$ of the compressor 14 is simple and inexpensive to implement in an electronic control unit 21 of an internal combustion engine 1 as it uses measurements supplied by sensors that are frequently present in modern internal combustion engines 1 and requires neither high calculation capacity, nor large memory occupation.

Furthermore, the above-described method for correcting the reduced mass flow rate $M_R$ of the compressor 14 enables making control of the wastegate 16 robust, prompt and oscillation-free in all operating conditions; in particular, even in operating condition where there is a significant flow of air directly from the intake manifold to the exhaust of the internal combustion engine 1.

What is claimed is:

1. A method for correcting an estimated reduced mass flow rate of a compressor in an internal combustion engine turbocharged with a turbocharger including a turbine and a compressor; the internal combustion engine having an intake manifold, a number of cylinders, and an exhaust system having an exhaust manifold wherein each cylinder is connected to the intake manifold by at least one respective inlet valve and to the exhaust manifold by at least one respective exhaust valve, to allow direct passage of a portion of air from the intake manifold to the exhaust manifold which does not participate in combustion so as to reduce turbolag; the method comprising the steps of:

determining a control law providing a target position of a wastegate as a function of a measured actual supercharging pressure and of the estimated reduced mass flow rate ($M_R$) of the compressor;

correcting the estimated reduced mass flow rate ($M_R$) of the compressor as a function of enthalpy of a gas mixture flowing through the turbine of the turbocharger and comprising both exhaust gases leaving the cylinders and the air passing directly from the intake manifold to the exhaust manifold;

determining the target supercharging pressure;

determining a first open-loop contribution factor of a corrected target position of the wastegate with the control law and as a function of the target supercharging pressure;

determining a second closed-loop contribution factor of the corrected target position of the wastegate with the control law and as a function of the actual supercharging pressure;

calculating the corrected target position of the wastegate by adding the first open-loop contribution factor and the second closed-loop contribution factor; and controlling the wastegate so as to pursue the corrected target position of the wastegate.

2. The correction method as set forth in claim 1, wherein correcting the estimated reduced mass flow rate ($M_R$) of the compressor as a function of the enthalpy of the gas mixture flowing through the turbine of the turbocharger is carried out with the following formula:

$$M_{R\_corr}=M_R/\eta_{scav}*H_{corr\_1}$$

where $M_{R\_corr}$ refers to the corrected reduced mass flow rate of the compressor;

where $M_R$ refers to the estimated reduced mass flow rate of the compressor;

where $\eta_{scav}$ refers to efficiency; and where $H_{corr\_1}$ refers to first corrective enthalpy value calculated with the following formula:

$$H_{corr\_1}=[1+(T_{air}/T_{ext})*(\eta_{scav}-1)]$$

where $T_{ext}$ refers to temperature of exhaust gases reaching the exhaust system; and where $T_{air}$ refers to temperature of the air measured inside the intake manifold.

3. The correction method as set forth in claim 1, wherein correcting the estimated reduced mass flow rate ($M_R$) of the compressor as a function of the enthalpy of the gas mixture flowing through the turbine of the turbocharger is carried out with the following formula:

$$M_{R\_corr}=M_R/\eta_{scav}*H_{corr\_2}$$

where $M_{R\_corr}$ refers to the corrected reduced mass flow rate of the compressor;

where $M_R$ refers to the estimated reduced mass flow rate of the compressor;

$\eta_{scav}$ refers to efficiency; and $H_{corr\_2}$ refers to second corrective enthalpy value.

4. The correction method as set forth in claim 3, wherein the second corrective enthalpy ($H_{corr\_2}$) is calculated with an adjustable map, which is a function of the following parameters:

$$H_{corr\_2}=f(\eta_{scav},T_{air}/T_{ext})$$

where $T_{ext}$ refers to temperature of exhaust gases reaching the exhaust system;

where $T_{air}$ refers to temperature of the air measured inside the intake manifold; and where $\eta_{scav}$ refers to efficiency.

5. The correction method as set forth in claim 2, wherein the efficiency ($\eta_{scav}$) is obtained from a ratio between the estimated reduced mass flow rate ($M_R$) of the compressor, which represents a total air mass flow rate through the internal combustion engine, and a mass flow rate ($m_{com}$) of air trapped in cylinders that participate in combustion.

6. The correction method as set forth in claim 5, wherein the estimated reduced mass flow rate ($M_R$) of the compressor is calculated with the following formula:

$$M_R=m_{com}+m_{scav}$$

where $M_R$ refers to the estimated reduced mass flow rate of the compressor;

where $m_{com}$ refers to mass flow rate of air trapped in the cylinders that participate in combustion; and where $m_{scav}$ refers to mass flow rate of air that is not involved in combustion and flows directly from the intake manifold to the exhaust manifold.

7. The correction method as set forth in claim 1, wherein correcting the estimated reduced mass flow rate ($M_R$) of the compressor as a function of the enthalpy of the gas mixture flowing through the turbine of the turbocharger is carried out with the following formula:

$$M_{R\_corr}=M_R/\eta_{scav}*H_{corr\_1}*H_{corr\_2}$$

where $M_{R\_corr}$ refers to the corrected reduced mass flow rate of the compressor;

where $M_R$ refers to the estimated reduced mass flow rate of the compressor;

where $H_{corr\_2}$ refers to second corrective enthalpy value;

where $\eta_{scav}$ refers to efficiency; and where $H_{corr\_1}$ refers to first corrective enthalpy value calculated with the following formula:

$$H_{corr\_1}=[1+(T_{air}/T_{ext})*(\eta_{scav}-1)]$$

where $T_{ext}$ refers to temperature of exhaust gases reaching the exhaust system; and where $T_{air}$ refers to temperature of the air measured inside the intake manifold.

8. The correction method as set forth in claim 1, wherein the enthalpy of the gas mixture flowing through the turbine of the turbocharger is obtained with the following formula:

$$H(T_{mixt})=M_R*Cp*T_{mixt}$$

where $M_R$ refers to the estimated reduced mass flow rate of the compressor, which represents a total air mass flow rate through the internal combustion engine;

where $Cp$ refers to specific heat of the gas mixture at a constant pressure; and where $T_{mixt}$ refers to temperature of the gas mixture flowing through the turbine of the turbocharger; and where $H$ refers to enthalpy of the estimated reduced mass flow rate ($M_R$) of the compressor.

9. The correction method as set forth in claim 8, wherein the temperature ($T_{mixt}$) of the gas mixture flowing through the turbine of the turbocharger is calculated as follows:

$$T_{mixt} = (T_{ext} * m_{com} + T_{air} * m_{scav})/M_R$$

where $T_{mixt}$ refers to the temperature of the gas mixture flowing through the turbine of the turbocharger;

where $M_R$ refers to the estimated reduced mass flow rate of the compressor;

where $T_{ext}$ refers to temperature of exhaust gases reaching the exhaust system;

where $T_{air}$ refers to temperature of the air measured inside the intake manifold;

where $m_{com}$ refers to mass flow rate of air trapped in cylinders that participate in combustion; and where $m_{sca}$ refers to mass flow rate of air that is not involved in combustion and flows directly from the intake manifold to the exhaust manifold.

10. The correction method as set forth in claim 1, wherein the direct passage of air from the intake manifold to the exhaust manifold is achieved by overlapping, with opportune timing, the inlet valves that connect each cylinder to the intake manifold and the exhaust valves that connect each cylinder to the exhaust manifold.

11. The correction method as set forth in claim 1, wherein the direct passage of air from the intake manifold to the exhaust manifold is achieved with a temporary deactivation of a part of the cylinders, which are controlled to allow the passage of air from the intake manifold to the exhaust manifold.

12. The correction method as set forth in claim 11, wherein the cylinders are divided into a number of active cylinders to be controlled, when in use, for injection and combustion, and a number of inactive cylinders to be controlled, when in use, to draw in a quantity of air in order to allow the air to flow from the intake manifold to the exhaust manifold.

* * * * *